(12) United States Patent
Anzai

(10) Patent No.: US 6,993,609 B2
(45) Date of Patent: Jan. 31, 2006

(54) METHOD FOR CONTROLLING PERIPHERAL DEVICE, PROGRAM FOR EXECUTING SAME METHOD, STORAGE DEVICE STORING SAME PROGRAM, AND COMPUTER, PERIPHERAL DEVICE AND SYSTEM FOR EXECUTING SAME METHOD

(75) Inventor: Katsuhiko Anzai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 10/242,708

(22) Filed: Sep. 13, 2002

(65) Prior Publication Data

US 2003/0074501 A1 Apr. 17, 2003

(30) Foreign Application Priority Data

Sep. 17, 2001 (JP) .......................... 2001-282399

(51) Int. Cl.
*G06F 13/00* (2006.01)

(52) U.S. Cl. .............................. 710/72; 710/6; 710/18
(58) Field of Classification Search .............. 379/100.9; 358/468, 1.84, 467; 719/301; 308/1.8; 400/124.04; 370/384, 354; 710/10, 1, 5–7, 15–19, 62, 710/72; 712/30; 361/69; 356/1.14, 1.8; 700/286
See application file for complete search history.

(56) References Cited

U.S. PATENT DOCUMENTS

| | | | | | |
|---|---|---|---|---|---|
| 5,326,183 | A | * | 7/1994 | Kasai et al. | 400/124.04 |
| 5,481,654 | A | * | 1/1996 | Kikuchi et al. | 358/1.8 |
| 5,506,790 | A | * | 4/1996 | Nguyen | 700/286 |
| 5,748,337 | A | * | 5/1998 | Minamizawa | 358/468 |
| 5,809,301 | A | * | 9/1998 | Miura | 719/310 |
| 6,510,211 | B1 | * | 1/2003 | McAfee et al. | 379/100.09 |

FOREIGN PATENT DOCUMENTS

| | | | | |
|---|---|---|---|---|
| JP | 410100510 | A | * | 4/1998 |
| JP | 2003091391 | A | * | 3/2003 |
| JP | 2003103875 | A | * | 4/2003 |
| WO | 99/38114 | | | 7/1999 |

* cited by examiner

Primary Examiner—Christopher B. Shin
(74) Attorney, Agent, or Firm—Fitzpatrick, Cella, Harper & Scinto

(57) ABSTRACT

A printer is a peripheral device capable of being controlled by a host computer. The printer has a silent function for silent operation. If a silent function is determined to be enabled and if a time period for enabling a silent function is set, a host computer determines whether a current time is within the time period or not. If the current time is determined to be within the time period, the host computer sends a control command for enabling a silent function to the printer.

24 Claims, 14 Drawing Sheets

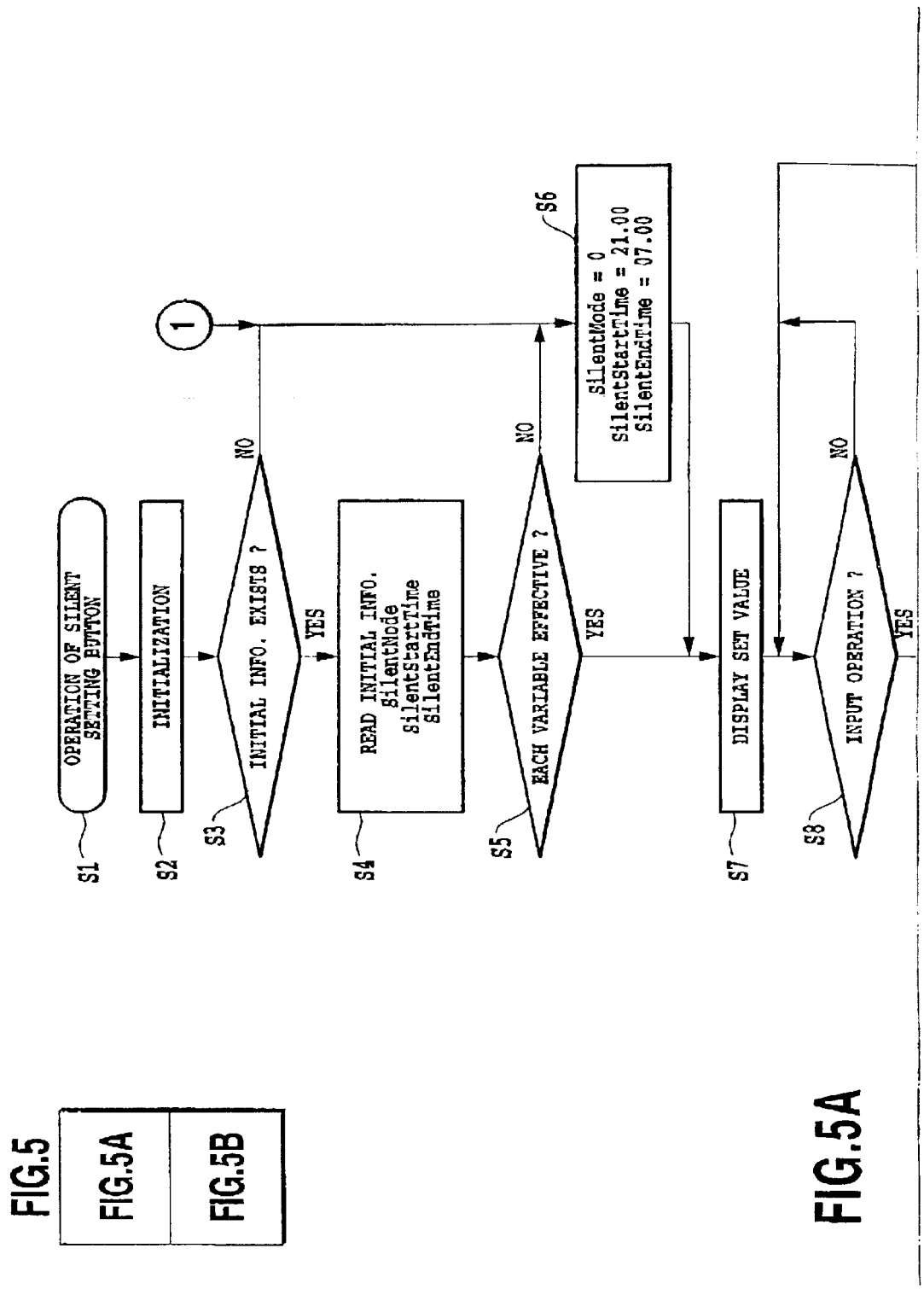

| FIG.7A |
| FIG.7B |

| FIG.8A |
| FIG.8B |

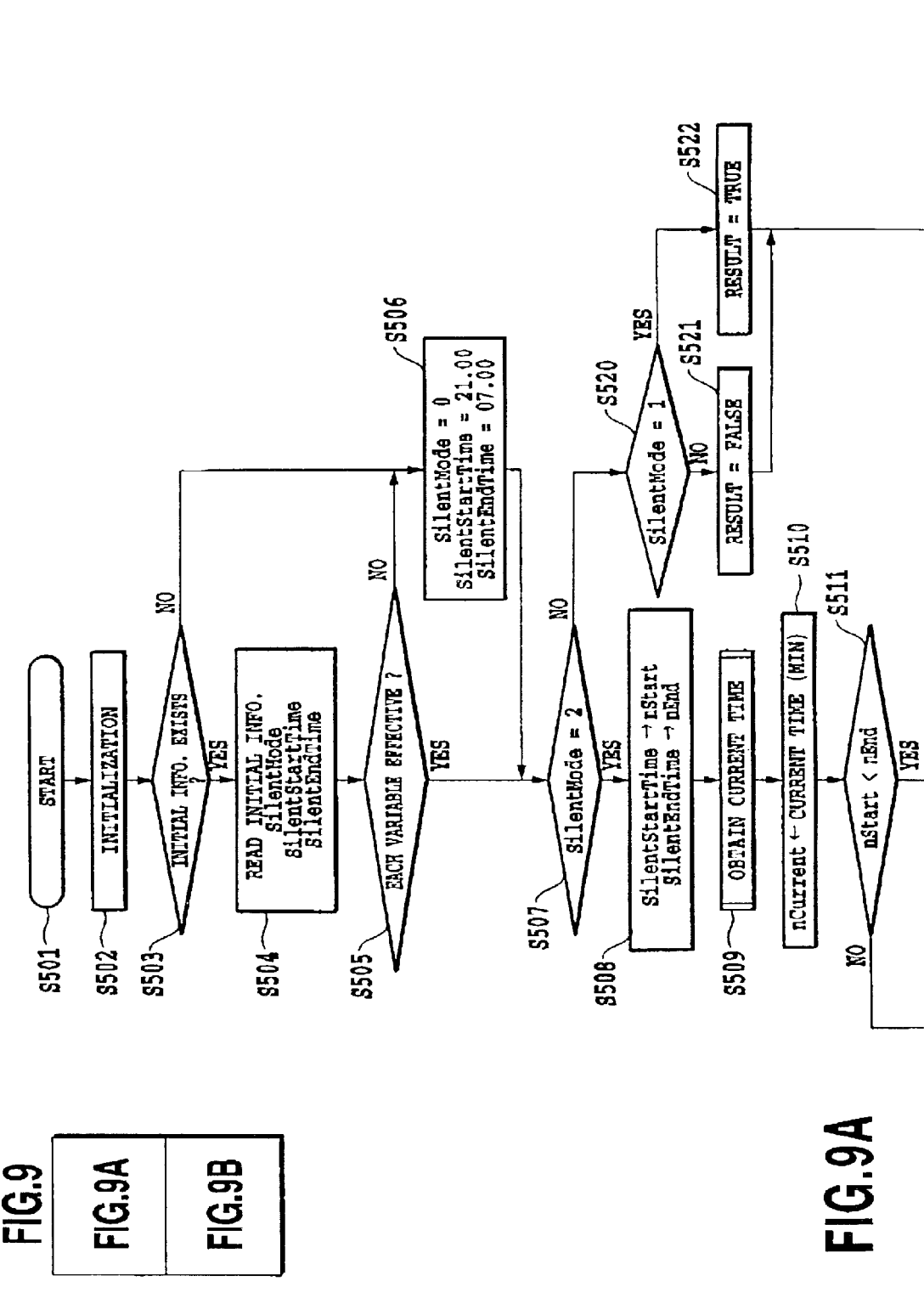

METHOD FOR CONTROLLING PERIPHERAL DEVICE, PROGRAM FOR EXECUTING SAME METHOD, STORAGE DEVICE STORING SAME PROGRAM, AND COMPUTER, PERIPHERAL DEVICE AND SYSTEM FOR EXECUTING SAME METHOD

This application is based on Patent Application No. 2001-282399 filed Sep. 17, 2001 in Japan, the content of which is incorporated hereinto by reference.

BACKGROUND OF THE INVENTION

1. Field of the Invention

The present invention relates to a method for controlling a peripheral device capable of being connected to a computer, a program (driver software) for executing the same method, a storage device for storing the same program, and a computer, a peripheral device and a system for executing the same method.

2. Description of the Related Art

Driver software for controlling a peripheral device includes one executing on a computer (a host computer) to control the peripheral device. Such driver software has a user interface (UI) for setting an operation of the peripheral device. The host computer sends a control command according to a user's setting to the peripheral device in order to change the setting of the peripheral device. The functions of the peripheral device are invariantly set in accordance with user's environment.

A function has been known, which makes a peripheral device perform a predetermined process starting at a desired time by using a scheduling function of a host computer. With this function, a predetermined process starts at a specified start time and the peripheral device continuously operates until the process ends. However, this function does not force processes to terminate at an end time specified in advance. A peripheral device with a timer function (system clock) also has been known. This peripheral device enables a start time or an end time to be set with the timer function. This peripheral device is assumed to operate only during a set time period and an operation of the peripheral device can be changed only during the period.

A conventional technology requires users to change a function setting of a peripheral device by using driver software each time to change the setting depending to the use environment. This is quite troublesome to users. It also causes an unexpected trouble in the case that the user fails to change a function setting.

In the case that the peripheral device is a printer (image output terminal), for example, an operation sound annoys users little during the daytime. However, users and others may be bothered in a silent environment such as at night with the operation sound of the printer such as a sound of feeding a print medium (paper), a sound of carrying the print medium, a sound of scanning a print head, or a printing sound and the like. Of course, some printers can print at low print rate (print speed) with relatively little sound. Such a printer, however, requires a user to select a silent mode each time he or she desires to print silently with driver software (a printer driver) that executes on a host computer. This is quite troublesome for the user. Moreover, if, for example, the user forgets to select a silent mode and the printing starts at midnight, just after the printer has actually started its operation, its large sound may surprise the user or may bother the other sleeping family members.

In a specific time period other than midnight, an operation sound from a peripheral device may cause a trouble depending on a use environment of the peripheral device. For example, in a library, a school, or other similar environment, it is required to be silent particularly, for example, during open time of the library or during class of the school. A large sound from the peripheral device may cause a trouble in such an environment.

The present invention is directed to overcome one or more of the problems as set forth above.

SUMMARY OF THE INVENTION

The method of the present invention is a method for controlling a peripheral device capable of being connected to a computer, including the steps of:

(a) determining whether to enable or disable a certain function of the peripheral device;

(b) setting information about a time period where the certain function is enabled;

(c) determining whether a current time is in the time period;

(d) performing a process to enable the certain function, if the certain function is determined to be enabled at step (a) and if the current time is determined to be in the time period at step (c).

A determining step (a) preferably includes a step of enabling or disabling the setting step (b) and the determining step (c). Preferably, steps (b) and (c) are performed if the certain function is determined to be enabled at step (a), and steps (b) and (c) are not performed if the certain function is determined to be disabled at step (a).

Preferably, information about the time period used in determination of step (c) is stored in storage means. If information is not stored in the storage means, a result of the determining step (c) is provided using a predetermined information.

Information about the time period is preferably more than one pair of information about a start time and an end time, between which the certain function is to be enabled.

Preferably, steps (a), (b), (c) and (d) are performed by a computer, with the step (d) including a step of sending a control command for enabling or disabling the certain function of the peripheral device.

Preferably, steps (c) and (d) are performed before the control command is sent from the computer to make the peripheral device perform a normal process, with the control command sent at the sending step being enabled when the peripheral device performs the normal process.

Preferably, information indicating the determination of the step (a) and information set in the step (b) are stored in predetermined storage means, and the control command sent at the sending step is enabled when the peripheral device is directly operated to perform its processes without using the computer.

Preferably, the certain function of the peripheral device is a function that enables the peripheral device to operate silently. Also preferably, the peripheral device is a printer and the certain function is a function for lowering one of operating speeds of the printer to reduce an operation sound.

The peripheral device may have sound generating means and the certain function may be a function for lowering a sound generated by the sound generating means.

Additionally, a program according to the present invention is a program capable of making a computer and/or a peripheral device perform steps included in the above-mentioned method.

Moreover, a storage medium according to the present invention is a storage medium for storing the above-mentioned program.

Further more, an apparatus according to the present invention is a computer, a peripheral device or a system including a peripheral device and a computer, the apparatus including: first determining means for determining whether a certain function of the peripheral device is to be enabled or disabled; setting means for setting information about a time period where the certain function is enabled; second determination means for determining whether a current time is within the time period or not; and processing means performing a process for enabling the certain function, if the certain function is determined to be enabled by the first determining means and if the current time is determined to be within the time period by the second determination means.

The above and other objects, effects, features and advantages of the present invention will become more apparent from the following description of embodiments thereof taken in conjunction with the accompanying drawings.

BRIEF DESCRIPTION OF THE DRAWINGS

FIG. 5 is a diagram showing the relationship between FIG. 5A and FIG. 5B. FIGS. 5A and 5B are flowcharts for describing a basic operation associated with the dialog box for setting the silent function;

FIG. 9 is a diagram showing the relationship between FIG. 9A and FIG. 9B. FIGS. 9A and 9B are flowcharts for describing an example of a processing procedure for sending a silent setting command when printing is performed in the system according to the present invention.

DETAILED DESCRIPTION OF PREFERRED EMBODIMENTS

Preferred embodiments according to the present invention will now be described with reference to drawings. In the embodiments, a printer is exemplified as a peripheral device of which functions are enabled or disabled depending on a time period.

Figure 1:
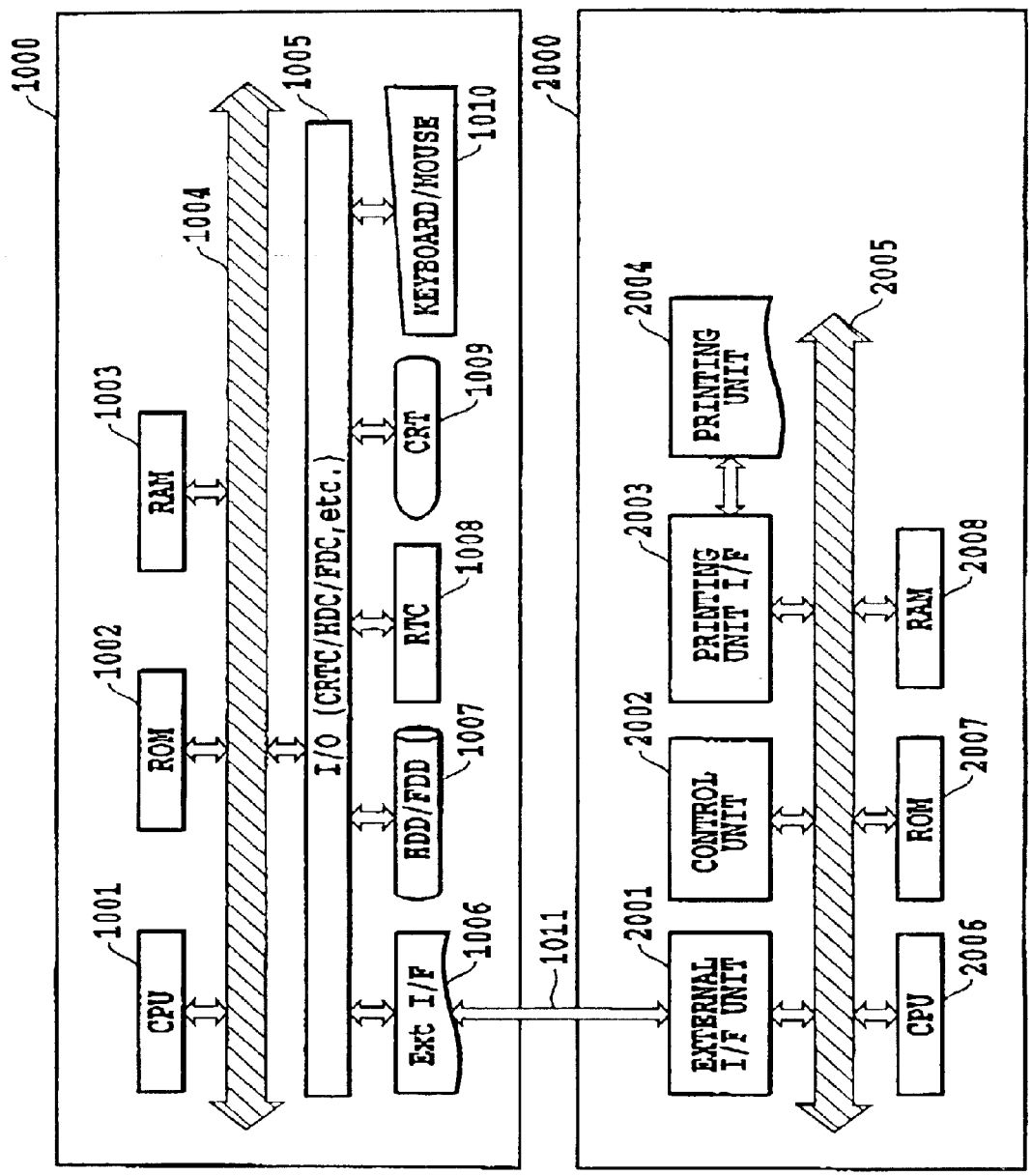
FIG. 1 is a block diagram showing one embodiment of a system according to the present invention.

FIG. 1 shows a system of one embodiment according to the present invention. The system of FIG. 1 generally includes a host computer 1000 that performs creation of print data (including control commands) and setting of a user interface for creating the data; and a printer 2000 that forms an image on a print medium on the basis of the print data from the host computer 1000.

A host computer 1000 includes a CPU 1001, a ROM 1002, a RAM 1003, a system bus 1004, an I/O controller for different input and output devices (CRTC, HDC, FDC, etc.) 1005, an external interface (I/F) 1006, an external storage device 1007 such as a hard disk drive (HDD) and a floppy (registered trademark) disk drive, a real time clock (RTC) 1008, a CRT 1009, and an input device 1010 such as a keyboard and a mouse.

The CPU 1001 operates in accordance with an application program, a communication program, a printer driver, an operating system (OS), etc., which are loaded from the external storage device 1007 to the RAM 1003. That is, when the power is supplied, the CPU 1001 is booted with the ROM 1002 and the OS is loaded from the external storage device 1007 into the RAM 1003. Then, the application program and driver software etc. are also loaded in the same manner to allow the CPU 1001 to operate as a system. The external I/F 1006 sequentially sends print data that has been spooled in the RAM 1003 and/or the external storage device 1007 (HDD). A user inputs their instructions with the input device 1010. The CPU 1001 and the like receive the instructions through the I/O controller 1005. The RTC 1008 clocks a system time and performs obtainment and setting of time information through the I/O controller 1005. The CRT 1009, which is a display device, is controlled by the CRTC in the I/O controller 1005. The CRT 1009 and the input device 1010 constitute a user interface.

On the other hand, a printer 2000 includes an external I/F 2001, a control unit 2002, a printing unit I/F 2003, a printing unit 2004, a system bus 2005, a CPU 2006, a ROM 2007, and a RAM 2008, etc.

The external I/F 2001 receives control commands or print data from the host computer 1000 and sends various pieces of status information to the host computer 1000. The control unit 2002 primarily generates data, which is to be used for printing of the printing unit 2004, on the basis of received print data. The printing unit 2004 receives output data from the printing unit I/F 2003 and serves as a printer engine for actually forming an image. The CPU 2006 controls the whole of the printer 2000. The ROM 2007 stores a control program for the printer 2000. The RAM 2008 is used as a work area such as a buffer area that is used by the external I/F 2001.

The printer 2000 may be any of a laser printer, a thermal transfer printer, a thermal printer, a dot impact printer, and an ink jet printer. In this embodiment, the printer 2000 is an ink jet printer with an ink jet head, which serves as the printing unit 2004. The ink jet head may be a print head using thermal energy or a print head using mechanical energy to eject ink therefrom. In this embodiment, the ink jet head has an electrothermal converting element (not shown) for each of nozzles and uses thermal energy generated by the electrothermal converting element to generate bubbles in the ink, thereby ejecting the ink through the nozzles by the pressure of the bubbles.

Figure 2:
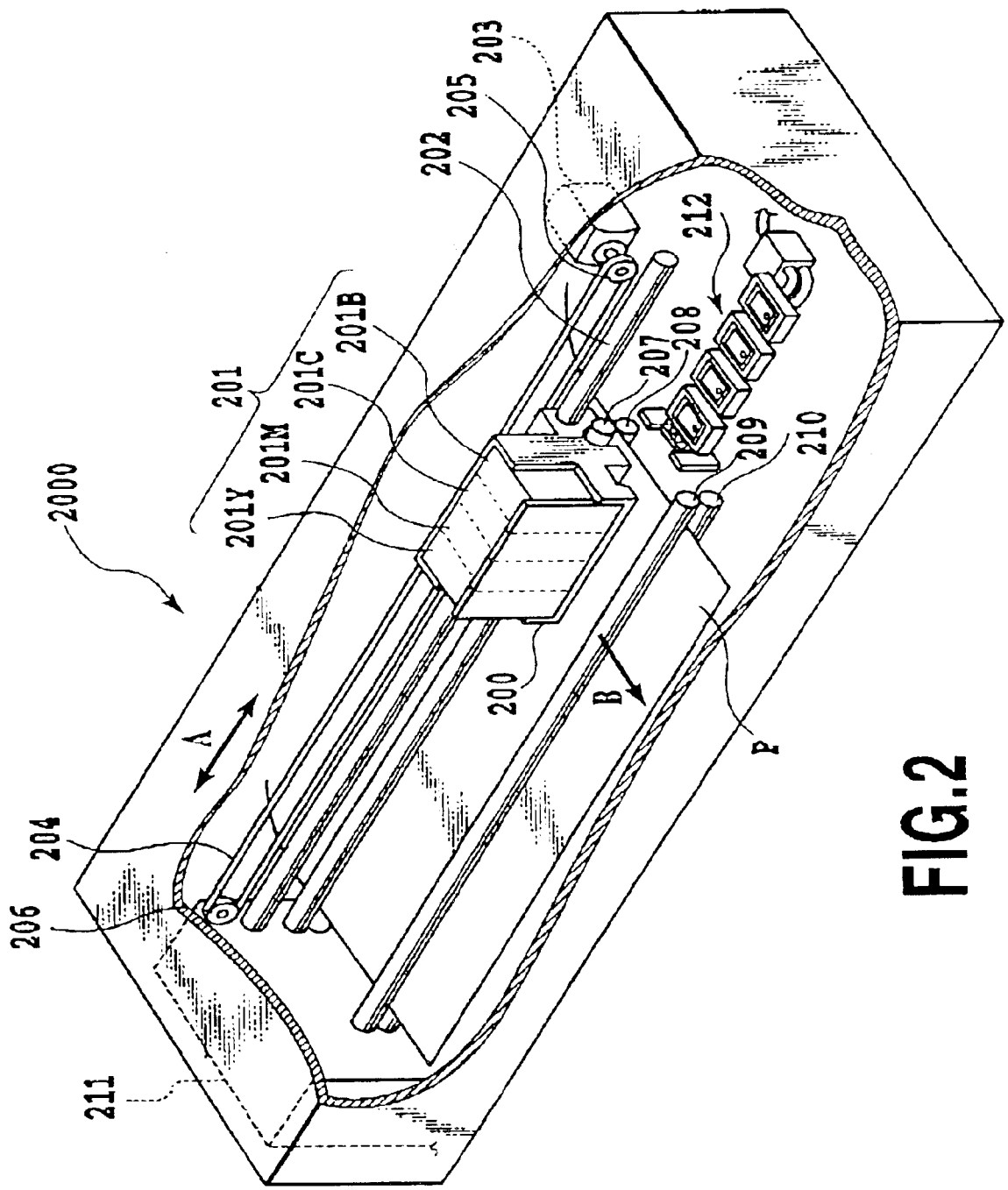
FIG. 2 is a perspective view showing a printer included in the system of FIG. 1.

FIG. 2 is a perspective view showing the printer 2000 of this embodiment. The printer of FIG. 2 is an image-forming device of a serial scanning type. The printer 2000 includes a carriage 200, which is movably guided by a guide shaft in a main scanning direction shown by an arrow A. The carriage 200 is connected with a belt 204, which is wound around pulleys 205 and 206. The carriage 200 is moved by the belt 204 in both way of the main scanning direction depending on the rotating direction of the pulley 205 driven by a carriage motor 203. The carriage 200 supports a print head 201. The print head 201 is an ink jet print head capable of ejecting ink. The carriage 200 carries the print head 201K for ejecting black ink, a print head 201C for ejecting cyan ink, a print head 201M for ejecting magenta ink, and a print head 201Y for ejecting yellow ink in order to form a color image. The print head 201K, 201C, 201M and 201Y can use thermal energy generated by the electrothermal converting element to eject ink. In this case, thermal energy generated by the electrothermal converting element generates bubbles in ink and the ink is ejected through the nozzles by expanding energy of the bubbles.

A print medium or paper P is carried intermittently in a sub scanning direction shown by an arrow B, which intersects the main scanning direction. That is, the paper P is carried in the sub scanning direction to oppose to the print head 201, with being held between an upstream pair of rollers 207 and 208, and between a downstream pair of rollers 209 and 210. Rollers 207, 208, 209 and 210 are driven by a driving unit 211. The carriage motor 203 may be used to drive these rollers.

The printer 2000 of this embodiment sequentially forms an image on the paper P by moving the print head 201 with the carriage 200 in the main scanning direction, with repeating a printing operation (ejecting ink against the paper P) and a carrying operation of the paper P in the sub scanning direction by a predetermined amount.

A carriage 200 returns to a home position, as desired, at the beginning of printing or on the way of printing. The home position is provided with a cap member 212 to cap each ink nozzle of the print head 201. The cap member 212 is connected to a vacuum pump and the like to make the pressure inside the cap member negative. By making the pressure inside the cap member 212 negative, which covers the ink nozzles of the print head 201, ink is vacuumed or ejected from the ink nozzles so that good ink ejection from the print head 201 is maintained. Such a process is referred to a "suction recovering process". Good ink ejection from the print head 201 can also be maintained by ejecting ink, which does not contribute to forming an image, through the ink nozzles toward inside of the cap member 212. Such a process is referred to an "ejection recovering process".

The printer 2000 of FIG. 2 is an image-forming device of a non-impact type and advantageously available to perform a high density and high speed printing operation with a low noise. The print head 201 of the printer 2000 can fully satisfies recent requirements for further speeding up the printing operation. However, speeding up of printing operation accompanies speeding up of operations of the main scanning (scanning of the print head) and the sub scanning (carrying of the paper), which result in larger operation sound from the printer. The operation sound from the printer is also generated while the printer performs feeding of the print medium or paper and the printing operation. As mentioned above, the large operation sound from the printer requires the user to be careful not to bother the other sleeping family members when he or she uses the printer late at night. Thus, it may not be a speed but silence that is required for a printer to be used late at night. To satisfy such a requirement, a printer of this embodiment has a silent function that allows silent printing. The printer of this embodiment may also include a silent mode for performing the silent function.

The silent function is enabled when the user selects a silent mode and a predetermined condition is satisfied. When a silent function is enabled, for example, under the control of the CPU 2006 in the printer 2000, driving signals for motors are appropriately set, and a scanning speed of the carriage, a feeding speed and a carrying speed of the print medium are set below normal values in order to lower the operation sound.

In this embodiment, the communication program and the printer driver for creating print data are installed onto the host computer 1000 and are stored in the HDD 1007. The printer driver controls the operation of the printer 2000 (including the operation in the silent mode) and allows the silent function of the printer 2000 to be set.

Figure 3:
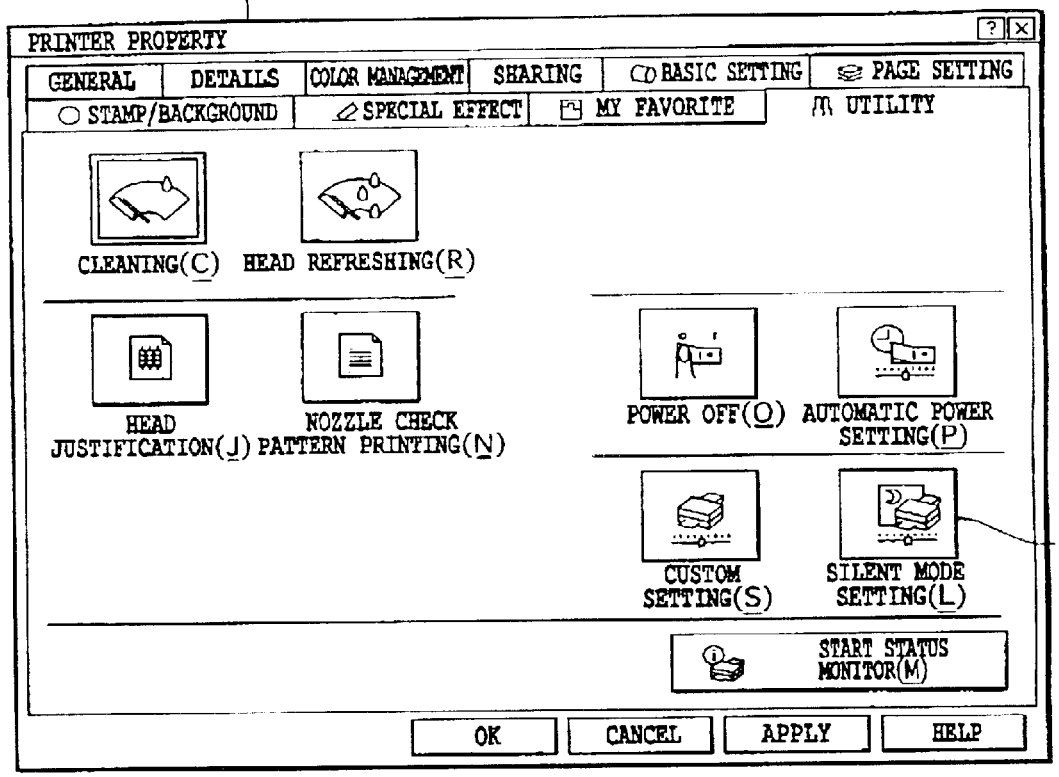
FIG. 3 is a diagram illustrating a utility screen associated with a printer driver according to the present invention.

FIG. 3 shows a utility screen 50 included in a property screen, which is provided by the printer driver of this embodiment. The utility screen 50 includes a plurality of control buttons. Control buttons include a silent mode setting button 51 to be clicked for setting the silent function as well as a button to be clicked for checking an ejecting condition of the print head by performing test printing and a button to be clicked for cleaning or performing ejection recovering process of the print head. When the button 51 is clicked, a dialog box 100 is opened for setting the silent function in detail.

FIG. 4 shows the dialog box 100 for setting the silent function in detail. The dialog box 100 includes three radio buttons 101, 102 and 103. If the user does "not use silent function", he or she checks the radio button 101. To "always use silent function", the user checks the radio button 102. To "use silent function within specified time period", the user checks the radio button 103. Radio buttons 101–103 are exclusively selectable. That is, when one of radio buttons 101–103 is selected, the other two buttons are disabled.

Figure 4A:
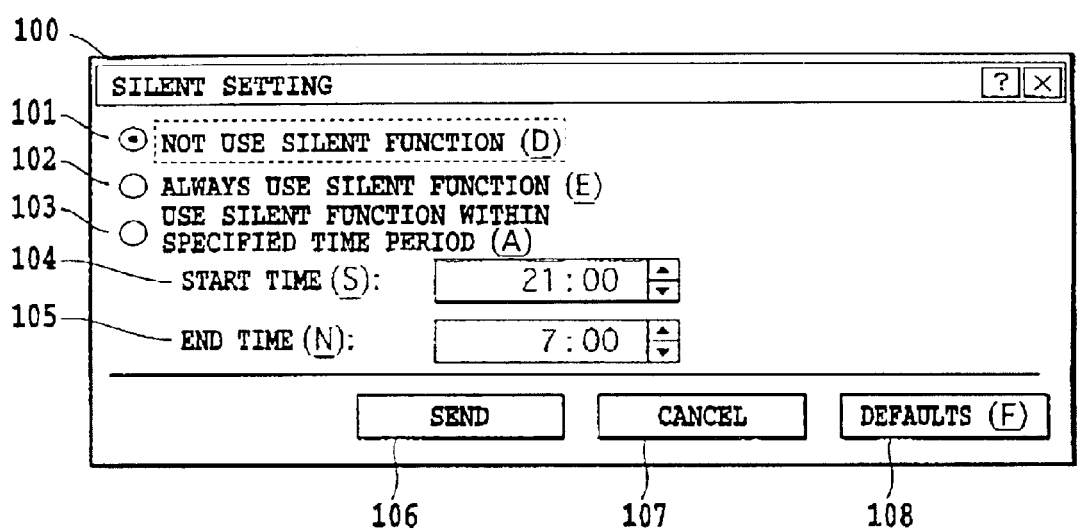
FIG. 4A and FIG. 4B are diagrams illustrating a dialog box for setting a silent function associated with the printer driver according to the present invention.

The dialog box 100 further includes control boxes 104 and 105 for setting time. Control boxes 104 and 105 are displayed in a faint color as shown in FIG. 4A, under the condition of an initial state, i.e., the radio button 101 is selected. When the user selects the radio button 103 to "use silent function within specified time period", control boxes 104 and 105 become available for entering desired start time and end time. Each of control boxes 104 and 105 includes a "hour" area 109 and a "minute" area 110 for directly entering a numeric value. When either the "hour" area 109 or the "minute" area 110 is selected, the user can increase or decrease the numeric value inside the selected area by using spin buttons 111 or 112 on the right.

Figure 5B:
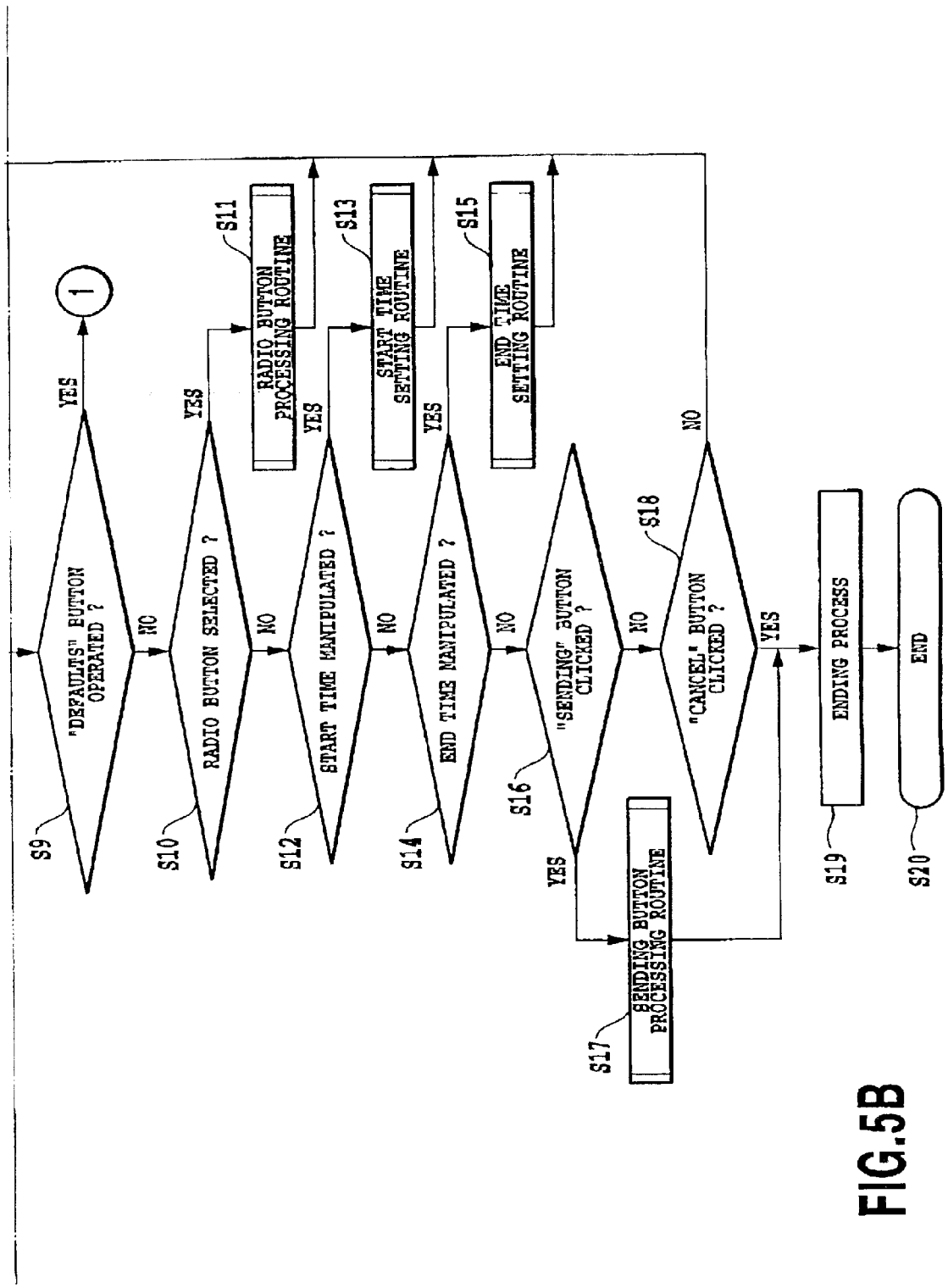

A basic operation associated with the dialog box 100 for setting the silent function will be described with reference to FIGS. 5A and 5B.

If the button 51 of the utility screen 50 shown in FIG. 3 is clicked, processes associated with the dialog box 100 shown in FIG. 4 is started at S1. The CPU 1001 of the computer 1000 performs initialization for displaying and manipulating the dialog box 100 at S2, and determines whether initial information associated with setting the silent function exists or not (S3). The term "initial information" refers to information stored in a system registry and/or an initialization file, which holds last status set by a user. The CPU 1001 determines whether information associated with the silent function setting in the registry or the file exists or not (S3). If initial information exists, the CPU 1001 reads values of the initial information from the system registry and/or the file, and sets a variable "SilentMode" indicating which radio button is selected, a variable "SilentStartTime" indicating a start time, and a variable "SilentEndTime" indicating an end time (S4).

Then, the CPU 1001 determines whether the set value of read information is within an effective range or not (S5). If the set value is determined not to be effective, or if initial information is determined not to exist at S3, the CPU 1001 sets (initializes) each variable at a default value (S6). Default values in this embodiment are Silent Mode=0, SilentStartTime=21.00, SilentEndTime=07.00. "SilentMode=0" indicates that the radio button 101 ("not use silent function") is selected. "SilentMode=1" indicates that the radio button 102 ("always use silent function") is selected. "SilentMode=2" indicates that the radio button 103 ("use silent function within specified time period") is selected. Variable "SilentStartTime" and variable "SilentEndTime" hold a start time or an end time in 24-hour unit with "hour" and "minute" separately. Values of variables "SilentMode", "SilentStartTime" and "SilentEndTime" are set in this manner and displayed in corresponding areas of the dialog box 100 (S7).

The CPU 1001 waits for a user's input operation (S8). When the input operation is carried out, the CPU 1001 performs processes following S9. When "DEFAULTS" button 108 (see FIGS. 4 and 5) is clicked (S9), each set value is returned to the default value at S6. In this case, each variable is set at the default value and the default value is displayed in the dialog box 100 (S7).

When the user selects any of radio buttons 101–103 (S10), the CPU 1001 performs a radio button processing routine (S11) to be described below, then returns to the input waiting state of S8. When the user manipulates the control box 104 for the start time (S12), the CPU 1001 performs a start time setting routine (S13) to be described below, then returns to the input waiting state of S8. When the user manipulates the control box 105 for the end time (S14), the CPU 1001 performs an end time setting routine (S15), then returns to the input waiting state of S8.

When the user clicks the "send" button 106 (S16), the CPU 1001 performs a send button processing routine (S17), which enables or disables each set value. Then, the CPU 1001 performs an ending process of the dialog box 100 at S19, and closes the dialog box 100 at S20. If the "cancel" button 107 is determined to be clicked at S18, the CPU 1001 clears the current setting and performs post-processing following S19, then closes the dialog box 100 (S20). If the button other than the "cancel button" 107 is clicked (S18), the CPU 1001 returns to the input waiting state of S8.

Now, the radio button processing routine (S11), the start time setting routine (s13) and the send button processing routine (S17) will be described in detail.

Figure 6:
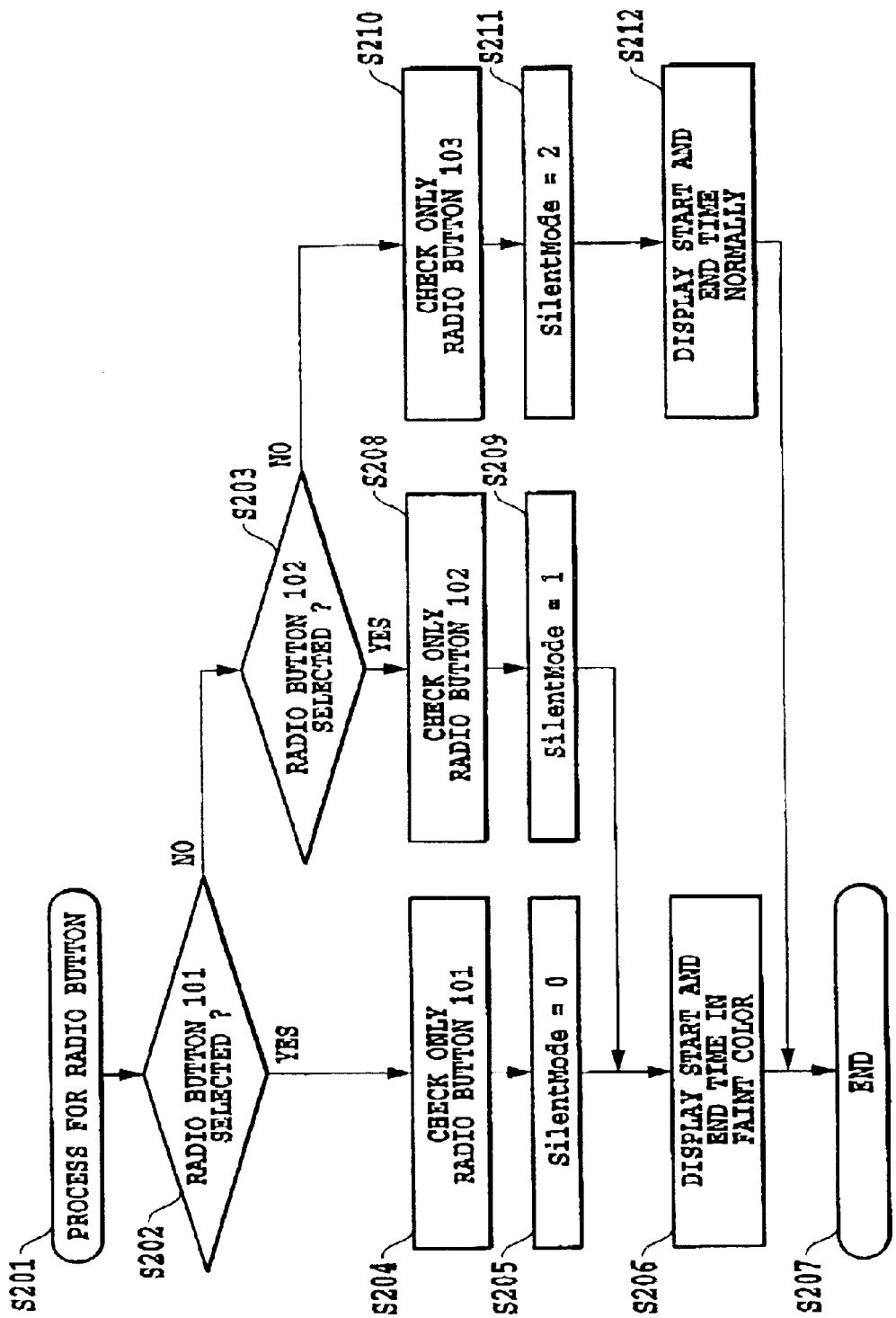
FIG. 6 is flowchart for describing a radio button processing routine.

FIGS. 6 is flowchart for describing the radio button processing routine (S11). After the user has selected one of radio buttons (S201), the CPU 1001 determines whether the radio button 101 is selected or not (S202). If the radio button 101 is selected, checks of the other radio buttons 102 and 103 are cleared and only the radio button 101 is set to be selected at S204. Then, the variable "SilentMode" is set at "0" at S205, which indicates the status to be "not use silent function." Further, control boxes 104 and 105 for setting the start time and the end time are displayed in a faint color (S206), and the radio button processing routine ends at (S207).

If the radio button 101 is determined not to be selected at S202, the CPU 1001 determines whether the radio button 102 is selected or not (S203). If the radio button 102 is selected, checks of the other radio buttons 101 and 103 are cleared and only the radio button 102 is set to be selected at S208. Then, the variable "SilentMode" is set at "1" at S209, which indicates the status to be "always use silent function." Further, control boxes 104 and 105 for setting the start time and the end time are displayed in a faint color (S206), and the radio button processing routine ends at (S207).

If the radio button 103 is determined to be selected at S203, checks of the other radio buttons 101 and 102 are cleared and only the radio button 103 is set to be selected at S210. Then, the variable "SilentMode" is set at "2" at S211, which indicates the status to be "use silent function within specified time period." Only in this case, control boxes 104 and 105 are displayed normally (S212). This allows the user to enter desired start time and end time. Then, the radio button processing routine ends (S207).

Figures 7, 7A:
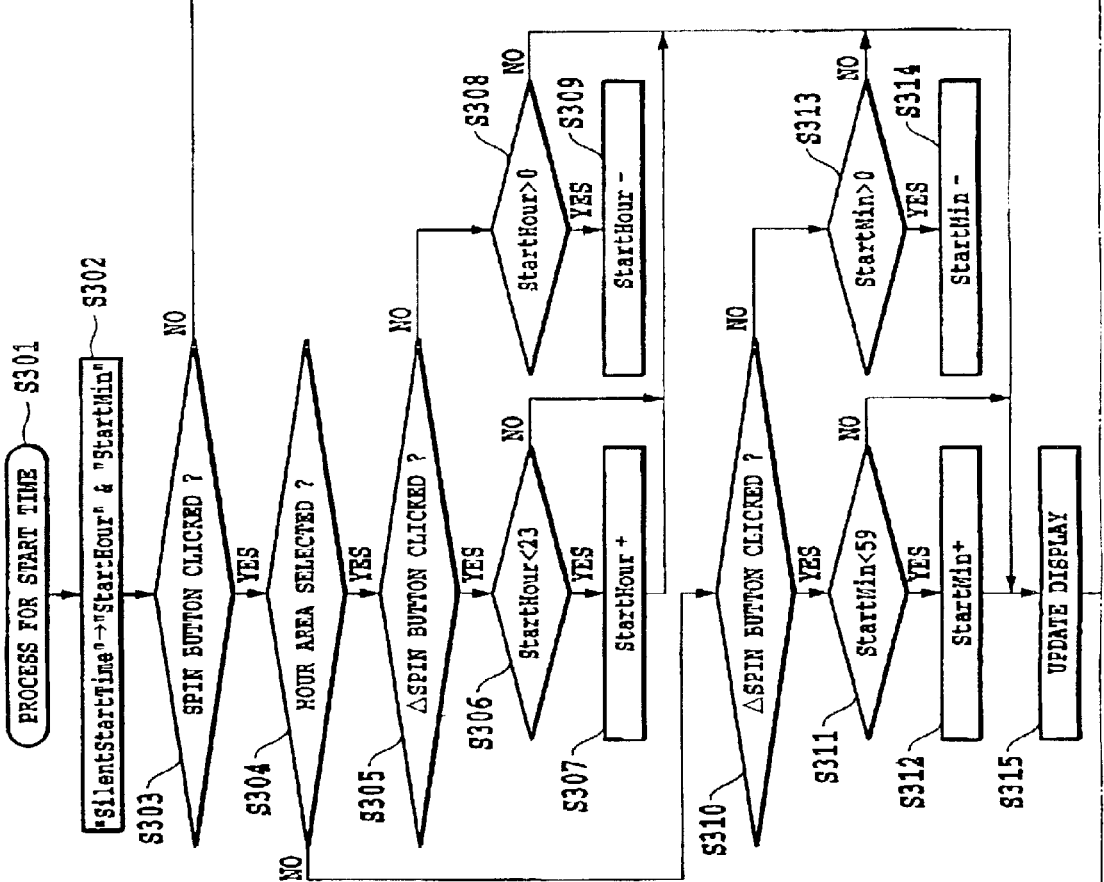
FIG. 7 is a diagram showing the relationship between FIG. 7A and FIG. 7B.
FIGS. 7A and 7B are flowcharts for describing a start time setting routine.
Figure 7B:
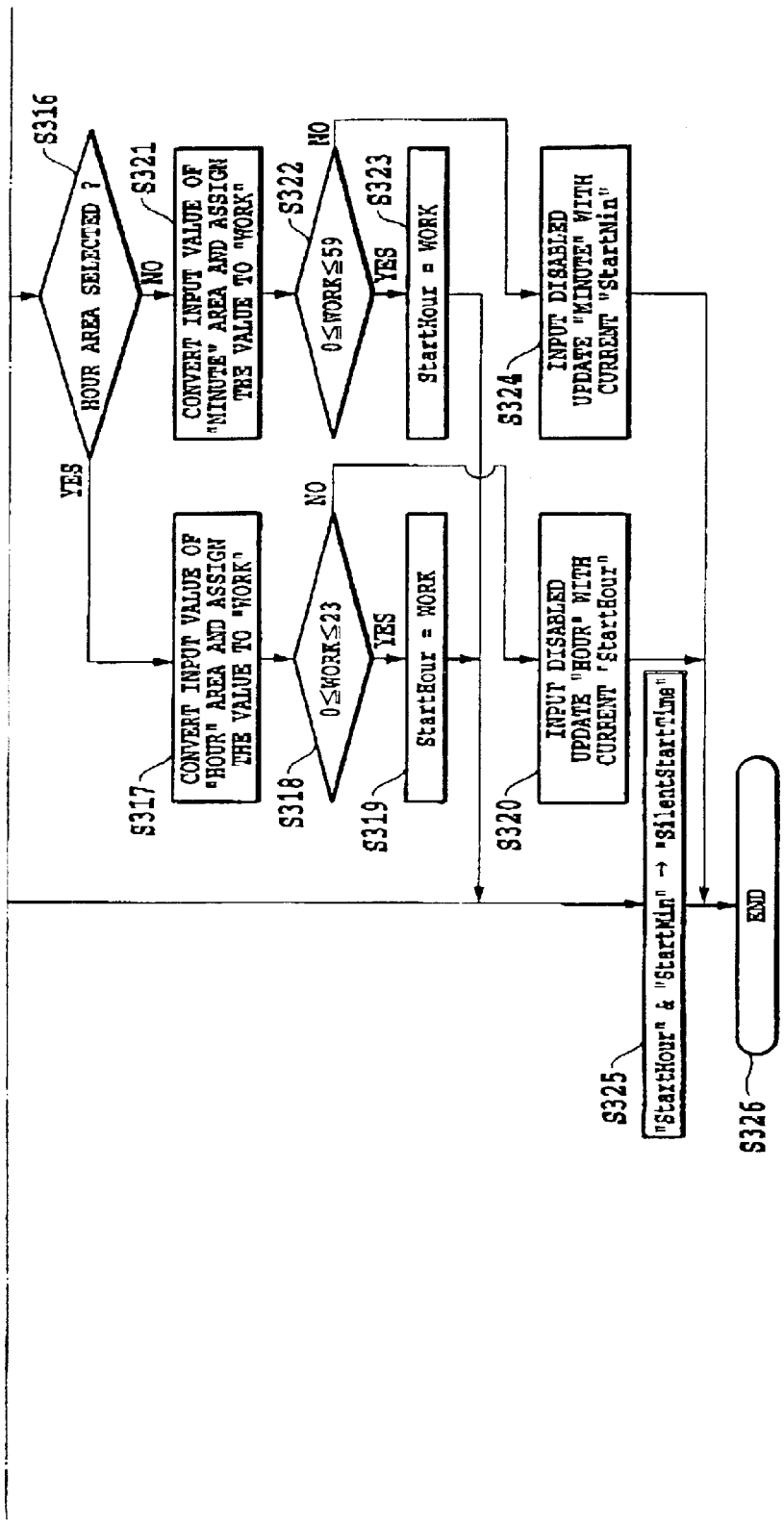

FIGS. 7A and 7B are flowcharts for describing the start time setting routine (S13). If the start time setting routine is selected (S301), a variable "SilentStartTime" is divided into a work variable "StartHour" for storing "hour" of the start time and a work variable "StartMin" for storing "minute" of the start time (S302).

Then, the CPU 1001 determines whether the spin button 111 or 112 is clicked or not (S303). If any of the spin buttons is clicked, the CPU 1001 determines whether the hour area is selected or not (S304). If the hour area is determined to be selected at S304, the CPU 1001 determines whether the spin button 111 for increment is clicked or not (S305). If the increment spin button 111 is clicked, the CPU 1001 determined whether the current value of the variable "StartHour" is less than "23" or not (S306). The CPU 1001 increments the variable "StartHour" by 1 only in the case that the value is determined to be less than "23" (S307). If the value is "23" or more, the variable "StartHour" is not changed and left as "23".

If the spin button 112 for decrement is determined to be clicked at S305, the CPU 1001 determines whether the variable "StartHour" is larger than "0" or not (S308), and decrements the variable "StartHour" by "1" only in the case the variable is larger than "0" (S309). If the variable is "0" or less, the variable "StartHour" is not changed and left as "0". When either spin button are manipulated, an updated value of the variable "StartHour" is displayed in the dialog box 100 at S315.

If the hour area is determined not to be selected at S304, the CPU 1001 performs similar processes for the minute area. That is, the CPU 1001 determines whether the increment spin button 111 is clicked or not (S310). If the increment spin button 111 is clicked, the CPU 1001 determines whether the current value of the variable "StartMin" is less than "59" or not (S311), and increments the variable "StartMin" by "1" only in the case the value is less than "59" (S312). If the value is "59" or more, the variable "StartMin" is not changed and left as "59". If the decrement spin button 112 is determined to be clicked (S310), the CPU 1001 determines whether the variable "StartMin" is more than "0" or not (S313), and decrements the variable "StartMin" by "1" only in the case the variable is more than "0" (S314). If the variable is "0" or less, the variable "StartMin" is not changed and left as "0". When either spin button is manipulated, an updated value of the variable "StartMin" is displayed in the dialog box 100 at S315.

On the other hand, either the spin button 111 or 112 is determined to be not clicked at S303, the CPU 1001 assumes the process as a numeric value input process, and determines whether the hour area is selected or not (S316).

If the "hour area" is determined to be selected, the CPU 1001 prepares a work variable "work", and converts the character string inputted in the "hour" area into a numeric value and assigns the converted value to the variable "work" (S317). Then, the CPU 1001 determines whether the variable "work" is between "0" and "23" or not (S318). If the variable "work" is determined to be within the above-mentioned range, the value of the variable "work" is assigned to the variable "StartHour" to set a new "hour" value (S319). If the variable "work" is determined to be outside the range at S318, the CPU 1001 disables the input and updates "hour" value with the current variable "StartHour" (S320).

In contrast, if the "minute" area is determined to be selected, the CPU 1001 prepares a work variable "work", and converts the character string inputted in the "minute" area into a numeric value and assign the converted value to the variable "work". Then, the CPU 1001 determines whether the variable "work" is between "0" and "59" or not (S322). If the variable "work" is determined to be within the above-mentioned range, the value of the variable "work" is assigned to the variable "StartMin" to set a new "minute" value (S323). If the variable "work" is determined to be outside the range at S322, the CPU 1001 disables the input and updates "minute" value with the current variable "StartMin" (S324).

When values of variables "StartHour" and "StartMin" are updated by the above-mentioned processes, the CPU 1001 updates the variable "SilentStartTime" with new variables "StartHour" and "StartMin" (S325), and ends this process (S326).

The detailed description of an end time setting routine (S15) will be omitted because it is performed generally in the same manner as the start time setting routine described with reference to FIGS. 7A and 7B. In the end time setting routine, names of predetermined variables are different from those used in the start time setting routine.

Figures 8, 8A:
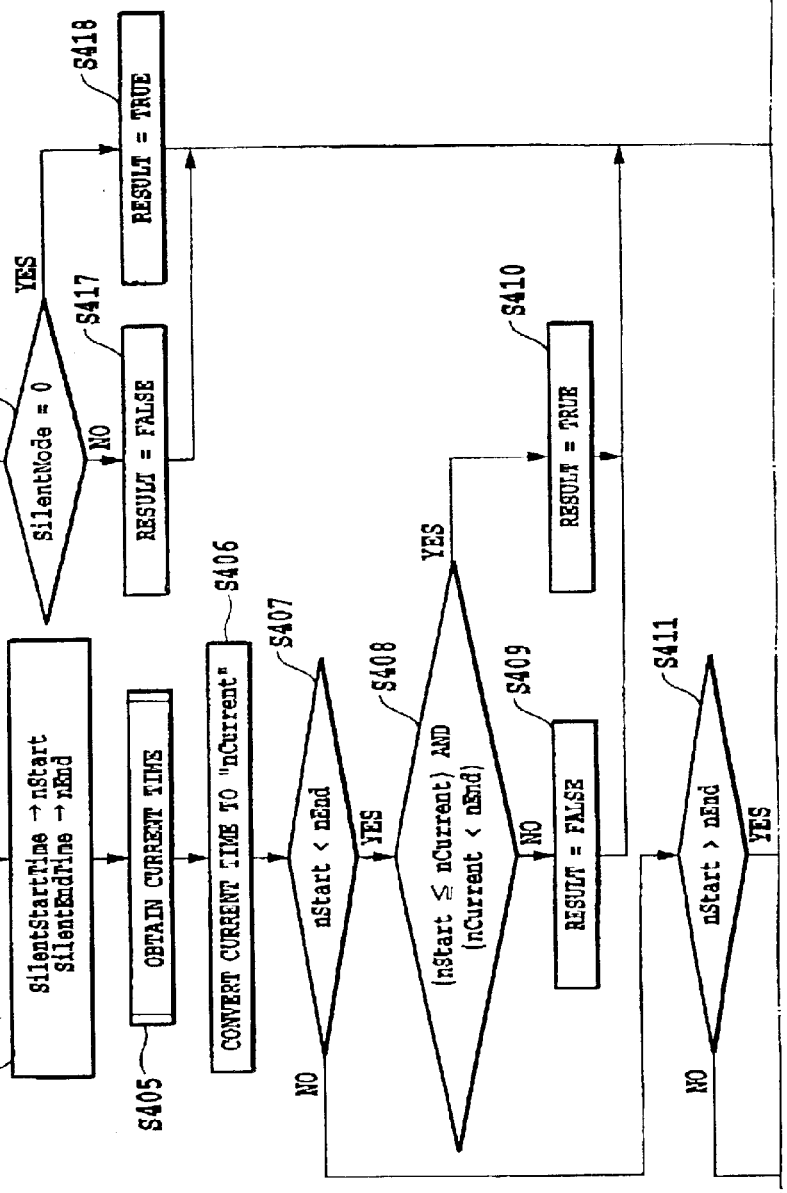
FIG. 8 is a diagram showing the relationship between FIG. 8A and FIG. 8B.
FIGS. 8A and 8B are flowcharts for describing a send button processing routine.
Figure 8B:
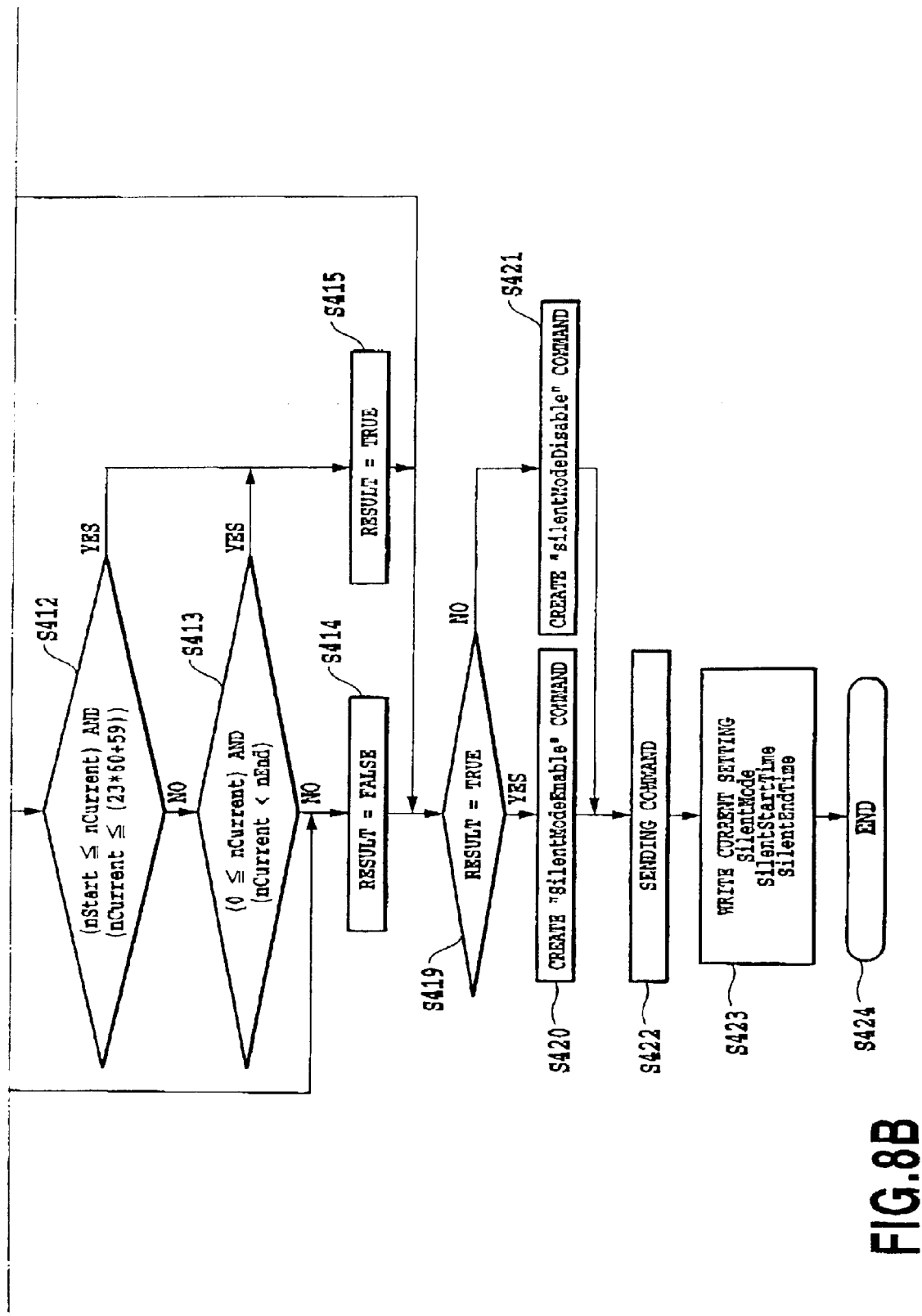

FIGS. 8A and 8B are flowcharts for describing the send button processing routine. When this routine starts at S401, various pre-processing for sending data such as reservation of a work area is performed (S402). Then, the CPU 1001 determines whether the value of the variable "SilentMode" is "2" or not (S403). If the value of the variable "SilentMode" is determined to be "2" (i.e., the user selects to "use silent function within specified time period"), the CPU 1001 obtains the current system time (current time) from the RTC 1008 and determines whether the current time is between the start time and the end time or not. Upon this determination process, the CPU 1001 converts the start time variable "SilentStartTime" and the end time variable "SilentEndTime" into values in unit "minute" and assign the converted values to work variables "nStart" and "nEnd" respectively (S404). Then, the CPU 1001 obtains the current system time from the RTC 1008 (S405). The obtained current time is also converted to a value in unit "minute" and assigned to a work area "ncurrent" at S406. After this, the start time, the end time and the current time is compared and determined by using the value in unit "minute".

The comparing/determining process for the current time, the start time and the end time is performed separately for two cases: one being a case that the start time and the end time are in the same day, and the other being a case that the start time is before p.m. 0:00 and the end time is after p.m. 0:00. That is, the CPU 1001 compares the variable "nStart" with the variable "nEnd" and it determines that the start time and the end time is in the same day if "nEnd" is larger than "nStart".

In this case, the CPU 1001 determines whether the following condition (1) is satisfied or not (S408).

$$\text{nStart} \leq \text{nCurrent and nCurrent} < \text{nEnd} \quad (1)$$

This process is performed to determine whether the current time is between the start time and the end time or not. If the condition of S408 is not satisfied, "FALSE" is assigned to a variable "Result" that indicates a determination result (S409). If the condition of S408 is satisfied, "TRUE" is assigned to the variable "Result" (S410).

If the CPU 1001 determines that a condition: nStart<nEnd does not satisfied at S407, the CPU 1001 determines whether a condition: nStart>nEnd is satisfied or not (S411). The fact that the condition of S411 is satisfied means that the start time is before p.m. 0:00 and the end time is after p.m. 0:00. If the condition of S411 is satisfied, the CPU 1001 determines whether the following condition (2) is satisfied or not (S412).

$$\text{nStart} \leq \text{nCurrent and nCurrent} \leq (23 \times 60 + 59) \quad (2)$$

This process is performed to determine whether the current time is in the same day or not. If the condition of S412 is not satisfied, the CPU 1001 determines whether the following condition (3) is satisfied or not (S413).

$$0 \leq \text{nCurrent and nCurrent} < \text{nEnd} \quad (3)$$

This process is performed to determine whether the current time is after p.m. 0:00 (in the next day).

With regard to the processes of S412 and S413, the condition: nCurrent≤(23×60+59) of S412 and the condition: 0≤nCurrent of S413 can be omitted because the variable "nCurrent" generally satisfies the condition: 0≤nCurrent≤(23×60+59).

If either the condition of S412 or the condition of S413 is determined to be satisfied, "TRUE" is assigned to the variable "Result" to indicate that the current time is between the start time and the end time and that the silent function is to be enabled (S415). If neither the condition of S412 nor the condition of S413 is determined to satisfied, "FALSE" is assigned to the variable "Result" to indicate that the current time is not between the start time and the end time and that the silent function is to be disabled (S414).

The fact that the condition: nStart>nEnd is not satisfied at S411 means that the current time and the end time is the same. In this case, the CPU 1001 determines that the time to enable the silent function is "0" and assigns "FALSE" to the variable "Result" at S414 to indicate that the silent function is disabled.

According to the above-mentioned processes, in the case that the value of the variable "SilentMode" is "2", the determined result regarding to the current time "TRUE" or "FALSE" is set at the variable "Result".

On the other hand, if the value of the variable "SilentMode" is determined not to be "2" at S403, the CPU 1001 determines whether the value of the variable "SilentMode" is "0" or not (S416). In this case, the silent function is set enabled/disabled independently of the current time. That is, if the value of the variable "SilentMode" is determined not to be "2" at S403, the CPU 1001 determines the value of the variable "SilentMode" is "0" or not (S416). The fact that the value of the variable "SilentMode" is determined to be "0" means that the user has selected "not use silent function". In this case, "FALSE" is assigned to the variable "Result" to indicate that the silent mode is disabled (off) at S417. In contrast, the fact that the value of the variable "SilentMode" is determined not to be "0" at S415 means that the user has selected "always use silent function". In this case, "TRUE" is assigned to the variable "Result" to indicate that the silent mode is enabled (on) at S418.

According to the above-mentioned processes, enabling/disabling of the silent mode is set to the variable "Result" in the form of the value "TRUE" or "FALSE" for each case.

Then, the CPU 1001 determines whether the variable "Result" is "TRUE" or not (S419). If the variable "Result" is "TRUE", the CPU 1001 creates a command "SilentModeEnable" for enabling the silent function (S420). If the variable "Result" is "FALSE", the CPU 1001 creates a command "SilentModeDisable" for disabling the silent function (S421). Either of the commands is stored in a predetermined work area of the RAM 1003. The created control command is sent from the host computer 1000 to the printer 2000 (S422). At S423, the CPU 1001 also writes values of variables "SilentMode", "SilentSartTime", and "SilentEndTime", which indicate the current setting, into the system registry or the information setting file, thereby allowing these values to be used as initial information in the case of printing or in the case that the dialog box 100 is opened next time. Then, the CPU 1001 finishes the send button processing routine (S424).

As mentioned above, according to the present invention, predetermined control commands are sent from the host computer 1000 to the printer 2000 and stored in the memory of the printer 2000, when information set for the silent function is written in the registry or the information setting file. This allows the printer 2000 to perform its processes with the silent function being enabled. That is, the user can make the printer 2000 perform the test printing or cleaning operation with the silent function being enabled by directly operating a control panel (not shown) of the printer 2000.

Next, the sending process of the command of the silent function from the printer driver to the printer 2000 when the print command is issued from the application program will now be described.

Figure 9B:
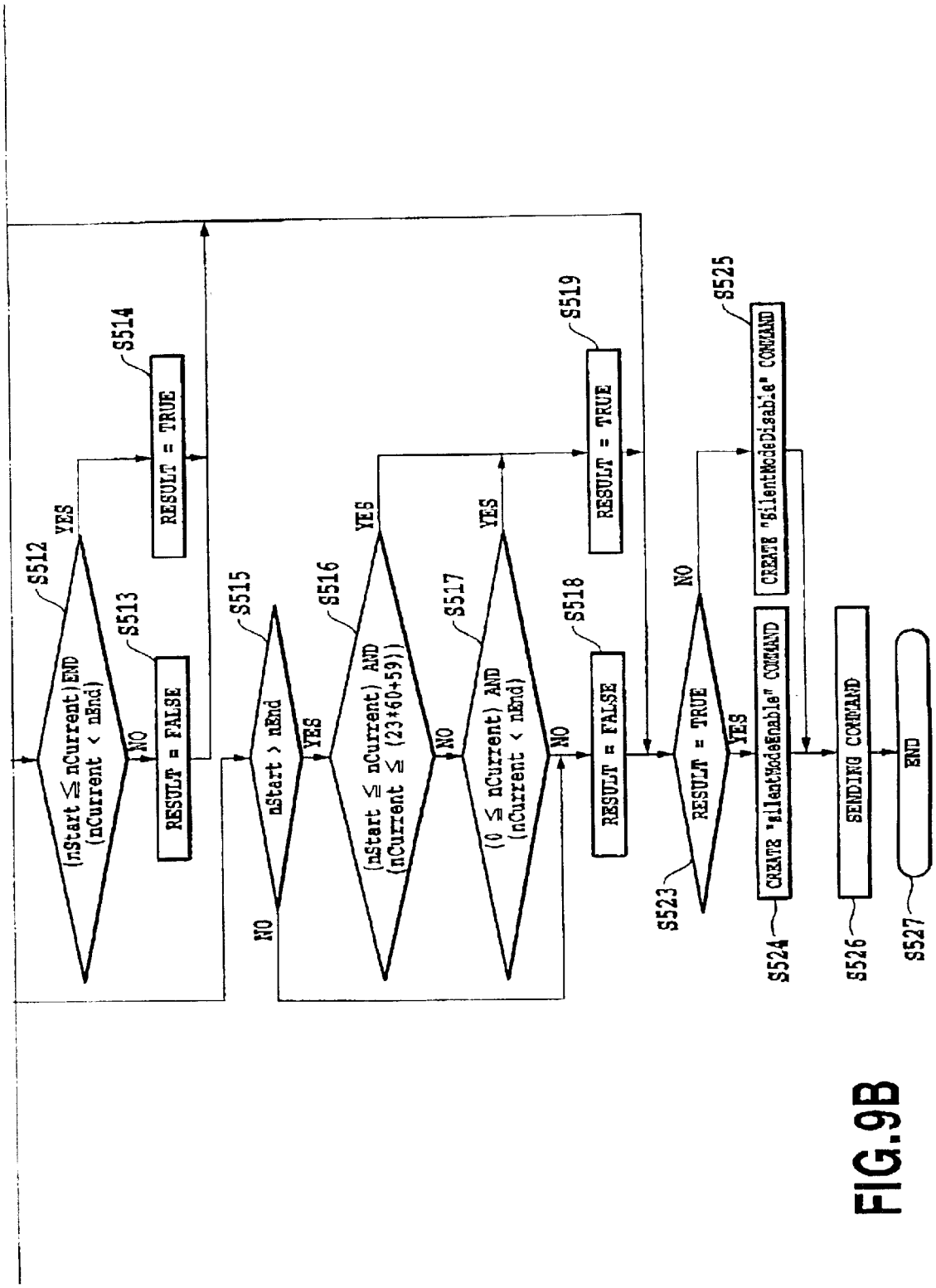

FIGS. 9A and 9B are flowcharts for describing an example of processing procedure for sending the silent setting command upon performing printing in the system of this embodiment. This process is executed just before sending normal control commands to the printer 2000.

The sending process of the silent setting command starts before the sending process of normal commands (S501). The CPU 1001 of the computer 1000 performs initialization such as reservation of working area (S502). Then, the CPU 1001 determines whether initial information relating to setting the silent function exists in a predetermined storage area or not (S503). If initial information does not exist in the storage area, the CPU 1001 sets the variable "SilentMode" at "0", the variable "SilentStartTime" at "21.00", and the variable "SilentEndTime" at "7.00" respectively (S506). If initial information exists in the storage area, the CPU 1001 reads out initial information (S504), and set respective variables "SilentMode", "SilentStartTime", and "SilentEndTime" at the read-out values.

Then, the CPU 1001 determines whether each variable is effective or not (S505). If an ineffective variable exists, the CPU 1001 sets each variable at the default value (S506). If each variable is determined to be effective at S505, or if each variable is set at the default value at S506, the CPU 1001 performs the command sending process to enable or disable the silent mode in accordance with the value of each variable and the current time obtained from the RTC 1008. This process is performed through the steps of S507–S526. Detailed description steps S507–S526 will be omitted because it is similar to steps S403–S422 shown in FIGS. 8A and 8B. After the created silent setting command is transmitted from the host computer 1000 to the printer 2000 (S526) and this process ends (S527).

As the result of the above-mentioned process, if the print start time (the current time) is between the start time and the end time set by the user (i.e., within the set time period), the printer 2000 performs a silent recording operation under the silent mode according to the silent setting command from the host computer 1000. In contrast, if the print start time (the current time) is not between the start time and the end time set by the user, the printer 2000 performs a high speed recording operation under a normal mode according to the command from the host computer 1000.

In the above description, a single pair of the start time and the end time set by the user is described, however, the present invention is not limited to this. Multiple pairs of the start time and the end time can be set depending on a certain function of the peripheral device such as the printer 2000. This allows a time for enabling the function of the peripheral device to be set in further detail. Moreover, the manner of setting the time period is not limited to inputting a pair of the start time and the end time. For example, it is also possible to input the start time and the period starting therefrom.

The manner of setting the time to enable the function of the peripheral device is not limited to setting both of "hour" and "minute". It is also possible to set only "hour". The dialog box for setting time is also not limited to examples illustrated in FIGS. 4A and 4B. For example, it is also possible to use a dialog box including a graph (bar) representing 24 hours for setting the start time and the end time. In such a graph, the user sets the start time and the end time by desirably moving pointers for the start time and the end time.

Although the printer is exemplified as a peripheral device in this embodiment, the present invention can be applied to other peripheral devices. The present invention can be applied, for example, to a peripheral device having sound generation means and means for lowering the sound generated by the sound generation means. Such a peripheral device includes a communication modem or a modulator-demodulator for communicating with a computer. Such a modem converts digital data from a computer into an audio signal and transfers the signal to a telephone line, and vice versa. Upon these operations, the modem generates a communication sound from a speaker and the like to let a user know a communication status. However, when the modem is used in a silent environment such as at night, the user and others may feel embarrassed about this communication sound echoing in the environment. Therefore, by applying the same control system as that of the above-mentioned embodiment to the modem, and sending the control command to the modem, a volume of the communication sound can be lowered or killed within a predetermined time. Of course, the modem can also operate with using the speaker set for a usual volume.

In either case, enabling/disabling of a certain function of the peripheral device can be desirably switched by effectively using the timer function of the host computer 1000 in this embodiment. This eliminates the requirement for switching enabling/disabling of the certain function of the peripheral device on driver software executing in the host computer 100 for each time. The present invention also allows users to set enabling/disabling of the certain function for the desired time period at their discretion. In the present invention, the current time and the control command corresponding to the user's setting are sent to the peripheral device for switching enabling/disabling of the certain function. Therefore, the user does not need to set enabling/disabling of the certain function of the peripheral device for each time the use environment changes or for each time the period to be used. This facilitates a setting operation by the user and improves an operability as a system. As for the peripheral device with rather large operation sound such as a printer, even if the user fails to set for lowering or killing the operation sound, setting of the above-mentioned silent mode surely eliminates problems such as making a noise in a relatively silent environment like at night.

In the above-mentioned embodiment, the obtainment of the current time is done in the host computer, so that the peripheral device can be controlled according to the current time without need to have a timer function in the peripheral device. This eliminates a need for equipping such as a real time clock, a battery for driving the RTC to the peripheral device and the like. As a result, it is possible to reduce a price (cost) of the peripheral device and the maintenance required for the device.

Figure 4B:
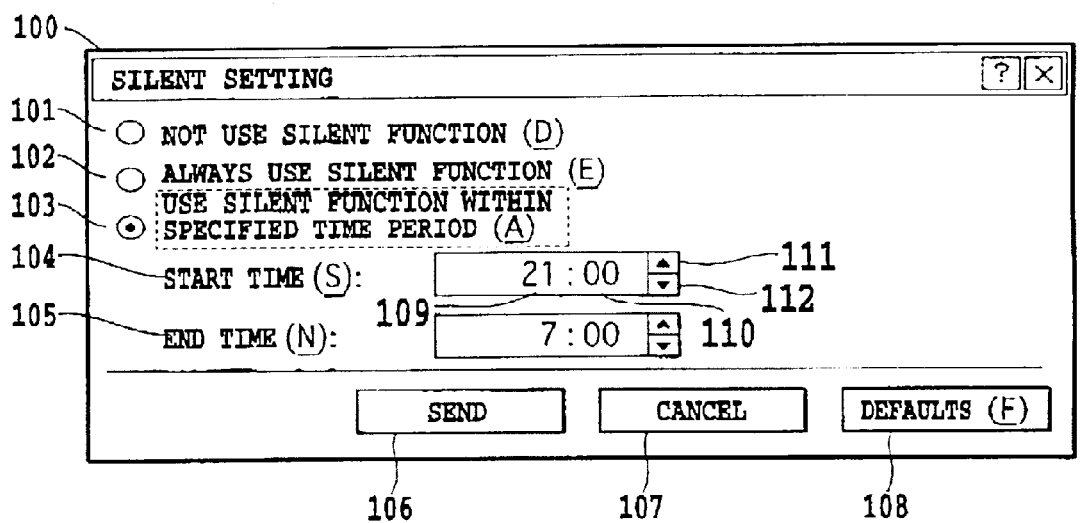

As shown in FIG. 4B, the above-mentioned embodiment includes the dialog box for setting the time period where the certain function is enabled, however, the present invention is not limited to this. It is also possible to set a time period where the certain function is disabled.

In the above-mentioned embodiment, whole of the processes including function setting, time setting, and determination are performed in the host computer (driver software), however, the present invention is not limited to this. A part or all of these processes may be performed in the peripheral device. For example, the control command for informing the current time may be sent from the host computer to the peripheral device before sending normal control commands. In this case, the same processes such as above-mentioned setting processes can be performed even in the peripheral device without providing a timer function with the peripheral device. The present invention may also be applied to a system of which host computer has not provided with a graphical user interface (GUI) thereon.

Further, it is not necessary to install a program (computer program product) for executing the above-mentioned processes onto the peripheral device in advance. That is, such a program can be appropriately provided to the peripheral device from the printer driver in the host computer.

Functions of the above-mentioned embodiments can be performed by providing an apparatus or a computer of a system, to which various peripheral devices are connected, with a program or a printer driver that realize the above-mentioned functions, and by making the peripheral devices operate by means of the program stored in the apparatus or the computer of the system. Such a system is also included in the scope of the present invention.

In this case, the program itself embodies a new function of the present invention. Therefore, the program itself, and a provision of the program to a computer through communication media or storage media are included in the scope of the present invention.

Storage media for storing the program include, for example, a floppy (registered trademarks) disk, a CD-ROM, a hard disk devise, an optical disk, a magnetic optical disk, a CD-R, a CD-RW, a DVD, a magnetic tape, a nonvolatile memory card, a ROM, etc.

Further, the functions of the above-mentioned embodiments can be performed by a computer that read out the program of the present invention and executes the program. Moreover, the Operating System on the computer may execute all or a part of the actual process in accordance with the instruction from the program. Such operations are also included in the scope of the present invention.

Further, the program stored in a storage medium may be written into a function extended board inserted into a computer or into memory of a function extended unit connected to a computer, and the function extended board or a CPU of the function extended unit can execute all or a part of the actual processes. Such operations are also included in the scope of the present invention.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A method for controlling a printing apparatus connected to a computer, the method comprising the steps of:
   a time information setting step of setting information about a time period in which the printing apparatus is to use a first of multiple operational modes to print;
   a determining step of determining whether a current time is within the time period set at said time information setting step; and
   a sending step of sending a command to the printing apparatus, wherein the command instructs the printing apparatus to print using the first operational mode in a case that the current time is determined to be within the time period, and wherein the command instructs the printing apparatus to use another of the multiple operational modes to print in a case that the current time is determined to be outside the time period.

2. The method of claim 1, further comprising a function determining step of determining whether the first operational mode of the printing apparatus is disabled, and wherein said sending step includes a step of sending a command commanding the printing apparatus to print using the other operational mode regardless of the time information set in said time information setting step in a case that the first operational mode is determined to be disabled at said function determining step.

3. The method of claim 2, further comprising:
   enabling said step of setting time information and said step of determining whether a current time is within a time period in a case that the first operational mode is determined to be enabled at said function determining step, and
   disabling said step of setting time information and said step of determining whether a current time is within a time period in a case that the first operational mode is determined to be disabled at said function determining step.

4. The method of claim 1, further comprising a step of storing information about the time period used in the determination at said determining step into storage means,
   wherein said determining step includes a step of determining whether the time period information is stored in the storage means and using predetermined time period information in a case that it is determined that the time period information is not stored in the storage means.

5. The method of claim 1, wherein said time information setting step includes a step of receiving at least a pair of information about a start time and an end time, between which the printing apparatus is to print using the first operational mode.

6. The method of claim 1, wherein said time information setting step, said determining step and said sending step are executed by the computer.

7. The method of claim 6, wherein said time information setting step and said determining step are executed before the computer executes said step of sending, and wherein the command sent at said sending step is performed in operation of the printing apparatus.

8. The method of claim 2, wherein information set at said function determining step and information set at said time information setting step are stored in a predetermined storage means, and wherein the command sent at said sending step is performed in operation of the printing apparatus.

9. The method of claim 1, wherein the first operational mode of the printing apparatus is a silent operational mode in which the printing apparatus prints more quietly than in other of the printing apparatus's operational modes.

10. The method of claim 9, wherein the printing apparatus is a printer, and wherein in the first operational mode an operating speed of one of a plurality of mechanical operations of the printer is lowered to reduce an operation sound generated with the mechanical operation.

11. The method of claim 1, wherein the printing apparatus is a printer for printing an image on a print medium, and wherein said determining step includes a step of determining whether a time when a print command is sent from the computer to the printer is within the time period.

12. The method of claim 11, wherein in the first operational mode an operating speed of one of a plurality of mechanical operations of the printer is lowered to reduce an operation sound generated with the mechanical operation.

13. The method of claim 1, wherein the printing apparatus includes a component that generates sound, and wherein in the first operational mode the sound generated by the component is lowered.

14. A computer program product for controlling a printing apparatus, comprising:
   computer-readable program code for setting information about a time period in which the printing apparatus is to use a first of multiple operational modes to print;
   computer-readable program code for determining whether a current time is within the time period set by said time information setting program code; and
   computer-readable program code for a sending a command to the printing apparatus, wherein the command instructs the printing apparatus to print using the first operational mode in a case that the current time is determined to be within the time period, and wherein the command instructs the printing apparatus to use another of the multiple operational modes to print in a case that the current time is determined to be outside the time period.

15. A computer-readable storage medium storing a program for controlling a printing apparatus, said program comprising:
   computer-readable program code for setting information about a time period in which the printing apparatus is to use a first of multiple operational modes to print;
   computer-readable program code for determining whether a current time is within the time period set by said time information setting code; and
   computer-readable program code for a sending a command to the printing apparatus, wherein the command instructs the printing apparatus to print using the first operational mode in a case that the current time is determined to be within the time period, and wherein the command instructs the printing apparatus to use another of the multiple operational modes to print in a case that the current time is determined to be outside the time period.

16. A computer capable of controlling a printing apparatus, comprising:
   a time information setting means for setting information about a time period in which the printing apparatus is to use a first of multiple operational modes to print;
   a determining means for determining whether a current time is within the time period set by said time information setting means; and
   a sending means for a sending a command to the printing apparatus, wherein the command instructs the printing apparatus to print using the first operational mode in a case that the current time is determined to be within the time period, and wherein the command instructs the printing apparatus to use another of the multiple operational modes to print in a case that the current time is determined to be outside the time period.

17. A system including a computer and a printing apparatus connected to the computer, said system comprising:
   a time information setting means for setting information about a time period in which the printing apparatus is to use a first of multiple operational modes to print;
   a determining means for determining whether a current time is within the time period set by said time information setting means; and
   a sending means for a sending a command to the printing apparatus, wherein the command instructs the printing apparatus to print using the first operational mode in a case that the current time is determined to be within the time period, and wherein the command instructs the printing apparatus to use another of the multiple operational modes to print in a case that the current time is determined to be outside the time period.

18. The system of claim 17, wherein said printing apparatus includes at least one of said time information setting means, said determining means, and said sending means.

19. A method for controlling a printing apparatus connected to a computer, comprising the steps of:
   setting step for setting information about a time period in which the printing apparatus is to use a first of multiple operational modes to print;
   a determining step of determining whether a current time is within the time period set at said time information setting step; and
   performing a process to control the printing apparatus to use the first operational mode to print in a case that the current time is determined to be within the time period set by said setting step.

20. A method for controlling a printing apparatus connected to a computer, comprising the steps of:
   setting step for setting information about a time period in which the printing apparatus is to be disabled from operating in a first of multiple operational modes to print;
   a determining step of determining whether a current time is within the time period set at said time information setting step; and
   performing a process to control the printing apparatus to use an operational mode other than the first operational mode to print in a case that the current time is determined to be within the time period set by said setting step.

21. A printing apparatus having a plurality of printing modes used by said apparatus to perform a print operation, said apparatus comprising:
   time information setting means for setting information about a time period in which a particular printing mode is enabled;

determining means for determining whether a current time is within said time period set by said time information setting means, when an instruction for performing a print operation is issued; and control means for causing said printing apparatus to perform the print operation in the particular printing mode in a case that the current time is determined to be within the time period by said determining means, and for causing said printing apparatus to perform the print operation in another printing mode in a case that the current time is determined by said determining means to be outside the time period.

22. A method for controlling a printing apparatus connected to a computer, the method comprising the steps of:

a time information setting step of setting information about a time period in which the printing apparatus is to use a first operational mode to print;

a determining step of determining whether a current time is within the time period set at said time information setting step; and a sending step of sending a command to the printing apparatus, wherein the command instructs the printing apparatus to print using the first operation mode in a case that the current time is determined to be within the time period, and wherein the command instructs the printing apparatus not to use the first operation mode to print in a case that the current time is determined to be outside the time period.

23. A method for controlling a printing apparatus connected to a computer, the method comprising the steps of:

a time information setting step of setting information about a time period in which the printing apparatus is to be disabled from the operating in a first operational mode to print;

a determining step of determining whether a current time is within the time period set at said time information setting step; and a performing step of performing a process to control the printing apparatus not to use the first operational mode to print in a case that the current time is determined to be within the time period set by said time information setting step.

24. A printing apparatus having a plurality of printing modes used by said apparatus to perform a print operation, said apparatus comprising:

connected to a computer the method comprising the steps of:

time information setting means for setting information about a time period in which particular printing mode is enabled;

determining means for determining whether a current time is within the time period set by said time information setting means, when an instruction for performing a print operation is issued; and control means for causing the printing apparatus to perform a print operation in the particular printing mode in a case that the current time is determined to be within the time period by said determining means, and for causing the printing apparatus not to perform the print operation in the particular printing mode in a case that the current time is determined by said determining means to be outside the time period.

* * * * *

UNITED STATES PATENT AND TRADEMARK OFFICE
CERTIFICATE OF CORRECTION

| | | |
|---|---|---|
| PATENT NO. | : 6,993,609 B2 | |
| APPLICATION NO. | : 10/242708 | |
| DATED | : January 31, 2006 | |
| INVENTOR(S) | : Katsuhiko Anzai | |

It is certified that error appears in the above-identified patent and that said Letters Patent is hereby corrected as shown below:

COVER PAGE:
(56) References Cited, FOREIGN PATENT DOCUMENTS, "2003091391 A" should read -- 2003-091391 A -- and "2003103875 A" should read -- 2003-103875 A --.

COLUMN 1:
Line 27, "with" should read -- with the --.

COLUMN 2:
Line 59, "operating" should read -- the operating --.

COLUMN 3:
Line 38, "is" should read -- is a --; and
Line 56, "to" should read -- to the --.

COLUMN 4:
Line 52, "of" should read -- of the --; and
Line 64, "way" should read -- ways --.

COLUMN 5:
Line 39, "inside" should read -- the inside --; and
Line 45, "satisfies" should read -- satisfy --.

COLUMN 6:
Line 48, "is" should read -- are --.

COLUMN 7:
Line 45, "FIGS. 6 is" should read -- FIG. 6 is a --.

COLUMN 8:
Line 23, "mined" should read -- mines --.

UNITED STATES PATENT AND TRADEMARK OFFICE
CERTIFICATE OF CORRECTION

PATENT NO. : 6,993,609 B2
APPLICATION NO. : 10/242708
DATED : January 31, 2006
INVENTOR(S) : Katsuhiko Anzai It is certified that error appears in the above-identified patent and that said Letters Patent is hereby corrected as shown below:

COLUMN 9:
Line 49, ""ncurrent"" should read -- "nCurrent" --.

COLUMN 10:
Line 6, "satisfied" should read -- satisfy --; and
Line 34, "satisfied," should read -- be satisfied, --.

COLUMN 11:
Line 48, "set" should read -- sets --.

COLUMN 13:
Line 19, "whole" should read -- all --.

COLUMN 14:
Line 42, "step, and" should read -- step; and --.

COLUMN 15:
Lines 38 and 56, "a" (first occurrence) should be deleted.

COLUMN 16:
Lines 7 and 23, "a" (second occurrence) should be deleted.

COLUMN 18:
Line 17, "which" should read --which a --.

Signed and Sealed this

Seventh Day of November, 2006

JON W. DUDAS
*Director of the United States Patent and Trademark Office*